Patented Oct. 25, 1949

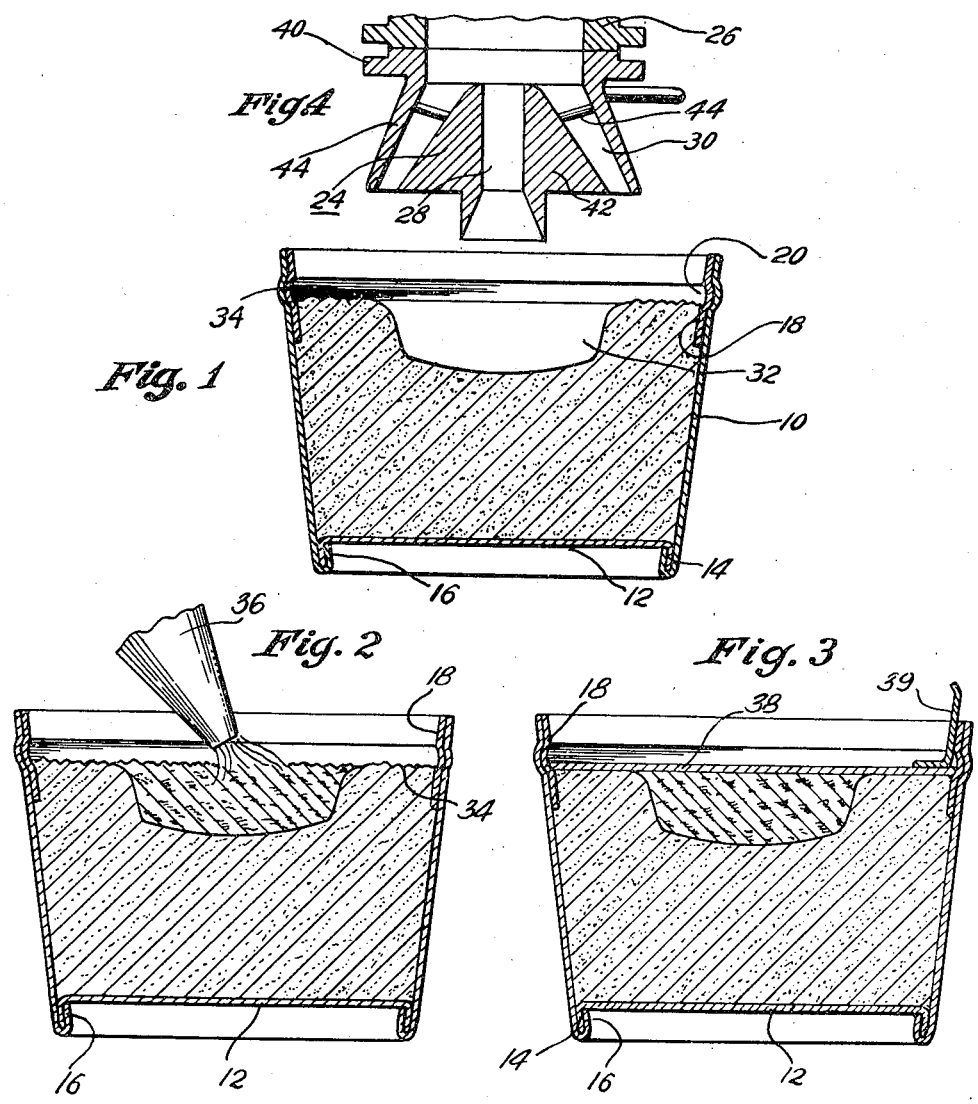

2,486,194

UNITED STATES PATENT OFFICE 2,486,194

PACKAGED SUNDAE

Frank T. Moser, Easton, Pa., assignor to Limpert Bros., Inc., Vineland, N. J., a corporation of New York Application December 16, 1947, Serial No. 791,974

4 Claims. (Cl. 99—137)

This invention relates to ice-cream sundaes and particularly to an improved sundae that may be stored indefinitely at low temperatures after being made by adding a syrup or other topping to partially congealed ice cream mix, the ice cream and topping being poured successively into a suitable paper cup or other container at proper temperatures and covered by a sealing cover.

An object of primary importance is that a special improved and novel form of nozzle is employed to pour the ice cream into the cup so that the mix will fill the cup to its filling line with the exception of a central well or depression into which the topping may be added by pouring or other method.

Another object of the invention is to so pour the semi-frozen ice cream into the cup in a manner to provide a wide fully filled ring of ice cream about the periphery of the well or depression and lying closely against the circular wall of the cup so that when the topping is added and the cover pressed into its place the topping will be prevented from spreading to the side wall and thus be liable to seep from the cup at the joint between the cup and cover. Another object of the invention is to provide a packaged ice-cream sundae in which the syrup or topping is effectively sealed in a central well in the ice-cream mix by the paper cover pressed against the annular upper surface of the mix, the contact of the cover when pressed against the surface of the mix and the mix solidified completely sealing the syrup and preventing the syrup from reaching and seeping past the edge of the paper cover.

With the above objects in view the invention includes the features of construction and operation set forth in the following specification and illustrated in the accompanying drawing.

In the accompanying drawing annexed hereto and forming a part of this specification, I have shown the invention embodied in a paper-cup form of packaged sundae in which a low freezing syrup is added to the previously admitted foundation of partially congealed ice cream, but it will be understood that the invention can be otherwise embodied and that the drawing is not to be construed as defining or limiting the scope of the invention, the claims appended to this specification being relied upon for that purpose.

In the drawing:

Fig. 1 shows a side elevation in section of a sundae paper cup after being filled with the desired quantity of partially congealed or frozen ice cream mix.

Fig. 2 shows a similar view of the cup after having had a liquid syrup or topping added to the ice cream mix;

Fig. 3 shows a similar view to Figs 2 and 3 after completing and sealing the sundae; and Fig. 4 shows a central sectional view of a nozzle used in the filling operation.

In the above mentioned drawing, there has been shown but one embodiment of the invention which is now deemed preferable, but it is to be understood that changes and modifications may be made within the scope of the appended claims without departing from the spirit of the invention.

Referring more in detail to the figures of the drawing there is shown a conventional cup preferably formed of heavy waxed paper and having a conical side wall 10. The bottom of the cup is closed by a peripherally flanged disk 12 also preferably formed of heavy waxed paper. As shown in the figures the flange 14 formed at the periphery of the bottom closing disk 12 fits between the side wall 10 and a bent up edge 16 of the side wall to lock the bottom 12 in place and form a tight joint at the bottom of the cup. The upper periphery of the cup has its edge 18 folded inwardly and downward to reinforce the top edge in the usual manner. A small beading 20 is also preferably formed into which the cover 20 may be pressed to form a tight joint but permitting ready removal of the cover as by a tab 39 prior to serving.

To fill the cup with the partially frozen ice-cream mix a special form of nozzle is employed shown in pouring position in Fig. 4. This nozzle 24 is mounted at the lower end of the filling member 26 to which it may be secured in any preferred manner not shown. The nozzle 24 has a central axial opening 28 flared at its lower end. In addition to this central supply opening 28 an annular opening 30 is provided which directs a large quantity of the ice cream mix against the sides of the cup while a relatively smaller amount passes through the central opening 28 the portion of the space within the cup surrounding the central portion is completely filled to a line just above the dotted line indicating the lower surface of the cover to which the completed sundae is filled. During the filling of the annular portion of the cup by admission of the mix to the annular opening 30 in the nozzle 24 the central opening 28 of the nozzle admits a smaller amount of the mix to the central portion and only partially fills this central portion. Filling is discontinued when a quantity of the mix fills the cup substantially to the outline shown in Fig. 1. A steep walled central depression 32 is thus formed surrounded by a thick annular wall 34 of the semi-fluid ice cream mix.

To the central depression is added, as by pouring from a simple nozzle 36, a sufficient amount (usually liquid), of the desired topping to completely fill the central depression 32. After the topping has been admitted to completely fill the depression 32 the cover 38 is pressed into place as shown in Fig. 3. The pressing of this cover 38 into its sealing position with its edge within the bead 20 forces downward the circular wall of mix adjacent the side wall of the cup. This wall of mix completely surrounds the topping in the depression 32, fits closely against the under side of the cover, and prevents any of the topping flowing from the depression. The topping cannot pass the wall of ice cream mix and seep from the joint between the cup 10 and cover 38. After being pressed into position as shown in Fig. 3 the cover 38 contacts the entire surface of the annular wall of mix. The cup after sealing by the cover 38 is then quickly frozen to a solid mass. By virtue of the solidity of this wall of ice cream when completely frozen a sealing ring for the topping is formed so that a thin, low freezing and quick melting topping may be used without danger of its being lost from the cup.

The above described sundae is of the packaged type which may be made up in large quantities and stored at or below freezing temperature until needed. The package made as above described is self-contained and may be served as made with the cover 38 still in place or after removal by the tab 39.

The above described nozzle 24 may be formed by an annular part 40 forming the outer member of the nozzle to which a central member 42 may be fastened as by radial pins 44 passing through member 40 and entering the member 42.

I claim as my invention:

1. A packaged sundae comprising a cup, a removable sealing cover therefor, a foundation of congealed ice cream therein, and a centrally disposed mass of fluid topping, said ice cream completely surrounding said topping, and said ice cream and topping both contacting said sealing cover, whereby said topping is prevented by said ice cream from seeping from the joint between said cup and cover.

2. The method of forming a packaged sundae comprising, pouring a mass of partially congealed ice cream mix into a cup to form an annular wall surrounding a central depression, filling said central depression with a fluid topping, and sealing said cup with a cover contacting said ice cream and topping over its entire surface.

3. The method of forming a packaged sundae comprising, pouring an annular supply of partially congealed ice cream into the peripheral portion of a conical cup, simultaneously pouring a smaller amount of said ice cream into the central portion of the cup whereby a deep steep walled recess within the cup is formed, filling said recess with a fluid topping, and sealing said cup with a cover contacting said ice cream and topping over its entire surface.

4. A packaged sundae comprising a paper cup having a conical wall, a permanently sealed bottom member therefor, a removable cover crimped to the upper portion of the conical wall, congealed ice-cream substantially filling said cup, and a centrally disposed mass of fluid topping, said ice-cream completely surrounding said topping, and said ice-cream and topping both contacting said sealing cover over its entire surface, whereby said topping is prevented by said congealed ice-cream from seeping from the joint between said cup and cover.

FRANK T. MOSER.

REFERENCES CITED

The following references are of record in the file of this patent:

UNITED STATES PATENTS

| Number | Name | Date |
| --- | --- | --- |
| 294,072 | Peaslee | Feb. 26, 1884 |
| 836,467 | Seebeck | Nov. 20, 1906 |
| 1,898,148 | Snodgrass | Feb. 21, 1933 |
| 1,988,392 | Niklason | Jan. 15, 1935 |
| 2,104,805 | Krein | Jan. 11, 1938 |
| 2,435,094 | Moser | Jan. 27, 1948 |